(12) United States Patent
Jindra et al.

(10) Patent No.: US 6,706,306 B2
(45) Date of Patent: Mar. 16, 2004

(54) COLD PROCESS METHOD FOR MAKING AN OVEN STABLE PECTIN BASE FOOD PASTE AND THE PASTE MADE BY SUCH METHOD

(75) Inventors: James A. Jindra, Wooster, OH (US); John P. Hansen, Wadsworth, OH (US)

(73) Assignee: The J. M. Smucker Company, Orrville, OH (US)

(*) Notice: Subject to any disclaimer, the term of this patent is extended or adjusted under 35 U.S.C. 154(b) by 121 days.

(21) Appl. No.: 10/136,687

(22) Filed: May 1, 2002

(65) Prior Publication Data

US 2003/0207015 A1 Nov. 6, 2003

(51) Int. Cl.$^7$ ................................................. A23L 1/95
(52) U.S. Cl. ........................ 426/578; 426/479; 426/661; 426/506
(58) Field of Search ............................... 426/578, 479, 426/661, 506, 283

(56) References Cited

U.S. PATENT DOCUMENTS

| | | | |
|---|---|---|---|
| 3,606,270 A | 9/1971 | Zimmerly | |
| 3,947,604 A | 3/1976 | McGinley et al. | |
| 4,219,646 A | 8/1980 | Rubens | |
| 4,465,702 A | 8/1984 | Eastman et al. | |
| 4,532,143 A | * 7/1985 | Brain et al. | 426/577 |
| 4,562,080 A | 12/1985 | Tenn | |
| 4,567,055 A | 1/1986 | Moore | |
| 4,634,596 A | 1/1987 | Eastman | |
| 4,704,293 A | 11/1987 | Moore et al. | |
| 4,752,494 A | 6/1988 | Tang et al. | |
| 5,011,701 A | 4/1991 | Baer et al. | |
| 5,102,680 A | 4/1992 | Glass et al. | |
| 5,366,750 A | 11/1994 | Morano | |
| 5,503,863 A | * 4/1996 | Brain et al. | 426/573 |
| 5,529,801 A | 6/1996 | Morano | |
| 5,652,009 A | 7/1997 | Mair | |
| 5,840,354 A | * 11/1998 | Baumann et al. | 426/74 |
| 5,932,270 A | 8/1999 | Rock | |
| 6,077,557 A | * 6/2000 | Gordon et al. | 426/573 |
| 6,113,968 A | * 9/2000 | McGuire et al. | 426/577 |
| 6,123,016 A | * 9/2000 | McGuire et al. | 99/483 |
| 6,251,466 B1 | * 6/2001 | McGuire et al. | 426/577 |
| 6,391,376 B1 | * 5/2002 | Hansen et al. | 426/661 |
| 6,416,805 B1 | * 7/2002 | Lewis et al. | 426/573 |
| 6,506,436 B2 | * 1/2003 | Rock et al. | 426/578 |
| 6,528,104 B1 | * 3/2003 | Jindra et al. | 426/321 |

OTHER PUBLICATIONS

Product Sheet on Mira Thik sold by A.E. Staley Manufacturing Company of Decatur, Illinois.
Product Sheet on BINASOL Starch sold by A.E. Staley Manufacturing Company of Decatur, Illinois.
Product Sheet on REDI–TEX sold by A.E. Staley Manufacturing Company of Decatur, Illinois.
Product Sheet regarding AVICEL sold by F.M.C. Corporation.
Brochure on several cold process starches available from A.E. Staley Manufacturing Company of Decatur, Illinois.
High Solids Vanilla Filling for Baking Products by Staley Food Ingredients.
Tri Blender—System Oriented Food, Beverage and Chemical Processing by Tri–Cover Inc.

* cited by examiner

Primary Examiner—N. Bhat
(74) Attorney, Agent, or Firm—Fay, Sharpe, Fagan, Minnich & McKee

(57) ABSTRACT

A cold process method for forming a pumpable, bake stable, pectin based food paste involving providing a liquid component containing solubilized pectin and a food ingredient, providing a dry component containing a gelling agent for the pectin, dry acid and buffer salt, selecting the particle size of the acid and salt to delay gelling by a desired time, rapidly blending the dry component into the liquid component for a time less than the desired time; and, transporting the blended components to a container where it gels into the food paste.

169 Claims, 8 Drawing Sheets

COLD PROCESS METHOD FOR MAKING AN OVEN STABLE PECTIN BASE FOOD PASTE AND THE PASTE MADE BY SUCH METHOD

The present invention is directed to the art of producing an oven stable food paste, such as a filling or topping for use in baked products. The bake products are fruit filled cereal bars, muffins, and cakes. Also, such products are pastries and cookies. More particularly the invention is a cold process to make high solids, pectin containing fruit paste which can be stored for long periods of time, can be pumped onto or into dough structures, and then baked into finished products.

INCORPORATION BY REFERENCE

Oven or bake stable fruit paste, such as fillings or toppings, is normally made by a method involving heating and cooling steps with the disadvantages associated with such hot food processing technology. As a substantial advance in this technology, a cold process was developed and is now widely used to produce a bake stable fruit paste. This cold process is described in Rock U.S. Pat. No. 5,932,270, incorporated by reference herein as background information since much of this prior technology is used to practice the present invention. This prior cold processing method and the present method both utilize a rapid, high power blender known as a Tri-Blender and described in Zimmerly U.S. Pat. No. 3,606,270. This patent is incorporated by reference herein to show generally the type of high speed blender used in practicing the present invention.

BACKGROUND OF INVENTION

The cold processing method as disclosed in Rock U.S. Pat. No. 5,932,270 employs cold water swelling starch as the stabilizer for the fruit paste. This prior cold processing method can not be used with pectin containing fillings, even though pectin stabilized filings can produce a better flavor and better customer acceptance and has a less pasty consistency and good appearance. Consequently, some manufacturers of baked dough products still prefer to use a paste made by the hot pectin process. This pectin process does not have the cost and time advantages of the cold process obtained by the prior art starch stabilizing method. But, it does have the advantages of pectin. Manufacturers of pectin stabilized high solid fruit paste normally use a hot processing technique because of the disadvantage of attempts to use a cold process for pectin stabilized fruit paste. Such hot pectin techniques produce a product with a total solids in excess of 60% and are commonly used in the food industry.

Pectin must be solubilized before being used as a stabilizer. Solubilization involves the dispersing and dissolving of pectin molecules in water. Solubilization involves dispersing pectin by strong agitation in order to separate the pectin particles while avoiding formation of agglomerated lumps. When the pectin particles are separated, and subsequently the pectin molecules themselves individualize, they swell due to exposure to water. By agitation in a large amount of water and with application of heat to facilitate solubilization, the pectin is activated for use in a fruit paste. Solubilization of pectin is normally done by agitation in a high amount of water at high temperature. Pectin solubilization must be addressed in either a hot process or the novel new cold process. Solubilization is required. In the past it was done in a low solids matrix and then used in a hot processing technology. Hot process in the food industry means a substantial amount of heat input and then cooling by heat withdrawal.

To produce a pectin stabilized paste, the pectin is initially solubilized. This is accomplished in a mixture having a total solid content substantially less than the final solids content for the paste. As mentioned, solubilization normally involves heating a low solids content liquid phase to a specific temperature and then adding powdered pectin under high agitation. The pectin is allowed to fully solubilize in a specific period of time while the pectin is exposed to a high percentage of water. It has been the conventional wisdom that pectin can be solubilized or activated only in a liquid phase having a solids content of less than 30% and at a high temperature, such as 160° to 180° F. This was because of difficulty in fully solubilizing and activating the pectin at a solids level greater than 30%. In addition, it is common practice to use high shear mixing of the pectin to fully disperse and dissolve the pectin into the low solids content liquid phase. High shear tends to avoid the formation of fish eyes or pectin lumps that can be detrimental to achieving the full functionality of the pectin. The water volume required to achieve efficient solubilization of the pectin exceeds the water allowed for in a high solids filling. This additional water must be removed either by heat or by a combination of heat and vacuum. Both of these processes add to the processing time and equipment necessary to produce a bake stable fruit paste using the normal hot process. It is further necessary to hold the high water liquid phase containing the solubilized pectin at a constant minimum temperature of about 160–170° F. until the pectin is to be combined with a high solids liquid phase to produce the final product. The high solids liquid phase must be heated to a temperature greater than 160° F. to mix with the pectin phase. This is necessary to avoid pregellation of the pectin as the low solids pectin solution is added to a high solids component or phase to make the paste. Maintaining this temperature, as required in the hot process, is also important because acid and/or calcium source for low methoxyl pectin fillings is added as a final step to the pectin stabilized filling. It is a common industry practice to make and add a 50% acid stock solution for pectin stabilized pastes. The calcium source for low methoxyl pectin fillings is dispersed separately in a small amount of water prior to adding to the batch. If the temperature of the batch is allowed to fall below a certain critical gelling temperature prior to the addition of the acid and/or calcium to gel the pectin, the pectin will prematurely gel and negatively impact the final targeted bake stability of the paste. This critical gelling temperature is dependent upon several factors, including the total solids content, the pH, the pectin concentration and the pectin reactivity, especially when the pectin is a low methoxyl pectin. Once the targeted final solids content for the paste has been reached, the paste must then be cooled mechanically to the fill temperature.

The hot process requires introduction of heat in the form of steam of electricity and, thus, requires substantial input of energy. In a high solids type paste, heating of the product during the processing requires a substantial amount of time and special equipment. Thus, time necessary to produce the product, such as a fruit paste, is increased when using the hot process, which process has heretofore been used when pectin is the stabilizer of choice. In addition, some food products, such as fruit paste used in bakery products, lose a portion of the fresh taste when exposed to a long period of heat before use in a baking operation. The paste takes on the characteristics of cooked fruit. This is commercially detrimental when a natural, fresh filling attribute is required for the end product. Fruit paste, and other food products, which have added flavoring and color pigmentation to enhance the taste, aroma and appearance have these characteristics diminished by using the hot process heretofore required to obtain the advantages of a pectin stabilized product. In most instances, fruit paste and other similar products are stored and then shipped to a bakery for subsequent use. Consequently, the hot paste must be cooled prior to packing. This added process operation increases the process time and increases the equipment required for producing a bake stable fruit paste. When the paste is cooled after it is made by a hot process and prior to packing, added time and equipment are required. This expense is not justified by an enhanced characteristic of a paste using pectin.

In addition to the energy needed to make the paste with a pectin stabilizer, high solids pectin paste also requires heat to solubilize the pectin. In the past, pectin was solubilized in excess water. Consequently, to remove the excess water required for pectin solubilization greatly increases the process time and the cost of producing pectin paste. The heating and cooling requirement for a hot process line, including solubilization of the pectin, creates a significant production bottleneck from the standpoint of throughput. The equipment necessary to handle the extremely high viscosities caused by a hot process is expensive and slow. These high viscosities typically developed when heating and cooling the filling during processing thus making handling and pumping more complicated. Consequently, such paste must be deposited into containers or drums at a temperature higher than those which are desirable for long term shelf life and flavor maintenance. Otherwise the paste is too thick to pump. In many instances, the paste, once packaged, must also be placed in a refrigerator to accelerate the cooling of the paste to room temperature. These are some of the many disadvantages associated with a hot process which is used to obtain the advantage of a pectin gel system for a paste or filling. A lot of the disadvantages can be overcome by using a cold process technology.

There currently exist a limited number of cold processes which results in a paste that can withstand the oven temperatures encountered during a baking operation; however, a cold process technology using pectin has not yet been developed. Exposure of the bakery filling to such high temperatures as seen in the baking operation negatively affect the desired functionality of the final food product. Oven or bake stability of the paste is primarily related to the type of stabilizing system and to a lesser extent the overall solids content of the paste. One prior cold processing method involves a stabilizer system using alginate. A bake stable paste can be produced using this process; however, there are distinct disadvantages when using alginates as explained in Rock U.S. Pat. No. 5,932,702. This patent discloses a recently developed cold process technology that employs granular instant starches in combination with microcrystalline cellulose as the stabilizer system. These two cold process technologies, one using alginates and one using granular instant starches, do not create a product with the organoleptic advantages associated with fillings stabilized with pectin. In summary, the presently used cold process technologies for making a bake stable food paste can not make a paste with the characteristics of a pectin stabilized product. The use of alginates is predicated upon the slow release of calcium within the stabilizing system for form a bake stable gel. Granular instant starch technology in Rock U.S. Pat. No. 5,932,270 relies upon cold hydration of the starches in a water starved system to impart bake stability to the end product. Both of these systems are limited in the sense that both stabilizing systems retard or mask flavors in the filling. The alginate process can have an inherent off-flavor derived primarily from its natural source, which in addition to the gel that forms, negatively impacts flavor and flavor release characteristics of the paste. As to the granular instant starch technology, there is also a negative effect on the flavor profile simply as a result of the high starch load required to achieve the necessary bake performance. Furthermore, granular starch technology imparts a pasty or heavy mouth feel not typically associated with natural fruit or fruit derived products. Consequently, the cold process technology with all its tremendous economic advantages is seriously limited when applied to the high solids oven stable or bake stable fruit paste of the type used as a filling or topping on baked goods. These processes have not heretofore been adapted for adoption of the advantages associated with pectin stabilized fruit products.

There exists a need for a cold process technology to produce a pectin based high solids oven stable or bake stable fruit paste, which process avoids the need for traditional pectin solubilization techniques common to industrial hot process methods of manufacturing such high solids pectin bakery filling. This prior solubilization technique of using high water amounts and the need to maintain temperature above a gelling temperature of the reacted pectin was believed to prevent use of pectin in a cold process.

THE PRESENT INVENTION

The present invention relates to the composition of a paste, which composition is accomplished by a cold process technology. "Paste" is a general term to mean fillings, toppings, etc. The invention involves the use of high methoxyl and/or low methoxyl pectins, wherein the first type pectin gels as a result of the combination of the proper pH and total solids and the latter type pectin gels primarily as a result of a cross linking reaction with calcium ions. Either one, or both pectins are dispersed into a buffered high solids liquid phase composed of a combination of corn syrup, dry sweetener, and fruit puree. The liquid phase is greater than 30% solids and more specifically is greater than 60% solids. Temperatures of the liquid phase typically range from 110–120° F. with mixing times of 5–20 minutes after the pectin is added. This mixing is at high agitation to solubilize the pectin in a high solids phase. A small amount of additional heat may be applied if desired. Such heat would not involve hot processing, since the temperature stays below 130° F.

The primary aspect of this invention is a method whereby pectin can be solubilized in a high solids environment at low temperatures to impart the necessary functionality or bake stability to the fruit paste. This invention presents a distinct departure from common accepted industry practices related to the manufacture of high solids, pectin bakery fillings. The invention also involves the use of a dry component. This dry component is ultra rapidly combined with the above discussed liquid phase containing pectin to produce a product which is packed immediately to accomplish the bake stability obtainable by practicing the present invention. The term dry blend composition or dry composition is defined as a component that has low free water. The dry blend composition is dependent upon the type of pectin being used and is used to promote the subsequent formation of the pectin gel once the two phases are rapidly combined and stored. The dry blend composition is a combination of acids and/or different calcium sources dependent upon the type of pectin being used or the bake stability required. The pectin in the liquid phase is gelled after being combined together with the dry phase and not before or during the step of combining the two phases. This rapid blending before pectin gelling provides the bake stability of the ultimate product. This result can be accomplished by a liquid to liquid embodiment like FIGS. 14 and 15 of Rock U.S. Pat. No. 5,932,270. This embodiment will be explained later.

Another aspect of the present invention is combining the acid and/or calcium source material with the pectin containing liquid phase at a temperature far below the gelling temperature of the pectin without formulation of pre-gel. The finished gelled paste possesses a total solids content of 60–85% and more typically 70–80% total solids. In addition, the water activity of the finished paste ranges from 0.50–0.80 or more typically in the range of 0.60–0.70. Typically, the water activity is 0.65–0.70 in the finished product. The novel characteristics of the paste produced in accordance with the invention are identifiable in the end product and result in the advantages of a paste constructed in accordance with the present invention utilizing a cold process technology, but still having the advantages of a pectin gel system. The pH of a finished filling or paste ranges from 3.0–5.0. Typically the pH is 3.2–3.8. In the preferred embodiment, the pH is in the range of 3.2–3.6 for high methoxyl pectin or 3.4 to 4.2 for low methoxyl pectin.

The present invention involves a cold process for making a pectin bake stable fruit paste including a fruit, water, corn syrup, acid, and/or a calcium source with acid buffer salts. The stabilizing system is comprised primarily of high methoxyl pectin, low methoxyl pectin or a combination of high methoxyl and low methoxyl pectin. The high methoxyl pectin can encompass a degree of esterification in the range of 62–72 or higher. The preferred DE is 68. The low methoxyl pectins are defined as pectins that are reactive with calcium ions. Those pectins have a DE range from 10–61. A DE of 38 is preferred in the present invention. Pectins can be derived from sources such as apples, citrus fruits, beets and other sources that meet the above mentioned requirements for DE. Pectin can also be combined with other stabilizers such as alginates, modified food starches, fruit powders such as apple powder, microcrystalline cellulose (MCC), carboxymethyl cellulose (CMC), or combinations thereof. The addition of these supplemental stabilizing components take advantage of synergies and other functionalities not provided by the pectin alone. Stabilizers in addition to pectin can be added either to the liquid phase or dry phase of the cold process. As an aspect of the invention, the pectin in the process have levels in the range of 0.1% to 1.5% by way of the total formulation and more particularly 0.8%–1.2% of the total formulation.

Another aspect of the present invention is the use of acid in combination with the high methoxyl and/or the low methoxyl pectin. These acids may be varied. For instance, some of the acids now used are citric acid, malic acid, adipic acids, acetic acid, glucono delta lactone and phosphoric acid. Citric acid and malic acid are preferred. The temperature of the liquid and the particle size of the acid in the dry form controls the rate at which the pectin reacts or gels when the pectin containing liquid phase is combined with the dry phase. The acid is present in the dry phase. To avoid pre-gellation of the pectin the correct acid is identified and is manipulated to control the rate at which the acid dissolves once the liquid phase and dry phase are combined. The rate of dissolution or solubilization of the dry acid when the phases are combined controls the rate at which the pH drops to gel the pectin. This control of gelling affects the bake stability of the final product. The optimum results are accomplished by controlling the particle size of the dry acid as related to the particle size of the buffer salt. The optimum particle size for the dry acid typically consists of a granulation that ranges from 149–590 microns. More specifically, at least 60% of the particles have a size in the range of 250–500 microns. The particle size that are more coarse tend to unduly delay pectin set times, while particle size that are finer tend to result in a rapid pre-gellation of the pectin. Slight modification of the particle size optimizes these two characteristics. Furthermore, this technology is defined as cold process. Temperature of the liquid phase typically ranges from 110° F. to 130° F. Prior to blending of the liquid and "dry" phrase, the liquid phase can be cooled to a temperature of 90° F. to 110° F. If the temperature of the liquids is too hot, 160° F. to 180° F., the acid will solubilize too rapidly causing the solubilized pectin to react and pre gel prior to depositing into the package.

In still a further aspect of the invention, the calcium ions are released from a calcium source located in the dry phase to gel the pectin when the pectin is a low methoxyl. Various calcium sources are available, such as calcium citrate, calcium lactate, tricalcium phosphate, dicalcium phosphate and calcium sulfate. Calcium citrate, tricalcium phosphate and dicalcium phosphate are preferred in practicing the invention. The rate of calcium ions released into the matrix as the liquid and dry phases are being blended, determines the rate at which the pectin reacts or gels. The pectin in the liquid phase is combined with the calcium source present in the dry phase. The calcium release rate is affected by the solubility and solubility rate of the individual calcium source as well as the rate at which the accompanying dry acids in the dry phase are solubilized by water from the liquid phase. The rate of solubilization of the dry acid is controlled by the granular size of the acid particles and the temperature of the combined liquid and dry phase. It is preferred to avoid pre-gellation of the low methoxyl pectin by identifying the optimum calcium source as well as the optimal acid to obtain a slow uniform release of calcium. This allows delayed gelling to obtain a paste with the required bake stability. Adjustment of the release rate of the calcium ions is known in the art and is used with hot process technology as well as being used in the cold process of the present invention.

In accordance with yet another aspect of the invention, buffer salt is used to facilitate pectin solubilization in the liquid phase. The salt prevents acid from the fruit from gelling the pectin as it is being solubilized in the liquid phase. Such salt is also used in the dry phase in combination with the dry acid to control the rate of acid and calcium release once the two phases are combined for blending. To control the rate of pectin gellation, once the liquid and dry phases are combined, the buffer salt be added to the dry phase as small particles. Some appropriate buffer salts are sodium citrate, potassium citrate and sodium phosphate. Other salts could be used. Buffer salt in the liquid phase is used primarily to raise the pH sufficiently to promote pectin solubilization without gelling. This is especially important when high methoxyl pectin is used since the solids content exceeds 55% or more. During solubilization a low pH with high solids could cause pre-gelling to defeat the cold process. Generally it is preferred that the buffer salt be present in the dry phase to control the rate at which the pH is lowered once the dry and liquid phases are combined. The buffer salt is manipulated to solubilize at a slower, equal, or faster rate than the acid thereby controlling pectin gellation. Solubilization of acid and salt is determined primarily by particle size, but is also affected by the temperature of the liquids. The key is to slow down the acid release, but not by using coarse particles. In this sense it is preferred that the buffer salt present in the dry phase solublize faster than the dry acid in the dry phase. This relationship between the conversion of the acid and salt to control the pH of the matrix after it has been mixed for blending, can be accomplished by adjusting the particle size distribution of the acid in relation to the particle size distribution of the buffer salt or visa versa. In this manner, upon introduction of water from the liquid phase, the buffer salt always solublizes faster than the dry acid in the dry phase. The buffer salt controls the rate at which the pH of the combined liquid and dry phases drop as a result of acid solubilization and indirectly the rate at which the calcium is released into the surrounding matrix once the two phases are combined. This action prevents pectin pre-gelation by moderating both the drop in pH and indirectly the rate of calcium release. Thus an ordered pectin network is formed resulting in a fruit paste with the necessary bake stability. The optimum particle size for the buffer salt in the dry phase consists of particles in the range of 44–590 microns. More specifically, 90% of the particles of the buffer salt range from 44 microns to 149 microns. The particle size distribution that are more coarse tend to result in pre-gelation of the pectin while a finer particle size distribution tends to delay pectin gelation. The large particles can not solubilize fast enough to counteract solubilization of the acid. With the finer particle sizes, the buffer salt is solubilized faster to delay drop in pH and thus slow down the pectin gelation to assure that it does not gel until after the two phases are mixed together and pumped into a package or storage container.

A paste formulated in accordance with the present invention and made by a cold process technology has minimal initial process viscosity when the liquid and dry phases are combined and rapidly blended. Consequently, the formulation is easily pumped to the packing station. At the packing station, the paste rapidly sets to a gel. The salt and acid is adjusted so gelling takes place in the storage container. This requires at least 1–2 minutes. In practice the blending is done in less than 60 seconds and preferably in the range of 5–30 seconds. Thus, gelling happens later and after the paste has been constituted.

The pectin in the paste is cold solubilized in the liquid phase of the process. In this phase, the total solids is greater than 30% and more typically greater than 60%. In the past, solubilization of the pectin was accomplished in a liquid having less than 30% solids. The phase had to be heated. In the present invention, the solubilization of the pectin is in a high solids liquid phase and is not heated. This procedure provides the unique characteristics obtained by the present invention when using cold process technology. The present invention makes a paste that withstands 400° F. for 10 minutes with less than 10% spread, and preferably with less than 7% spread. This property was heretofore obtained only by hot process technology, especially when used for a variety of pH based compositions having a high solid content. These are the properties of most bake stable fruit paste used in bake products filled by or covered with a fruit paste. The paste has a minimal process viscosity after it has been blended. Thus, the paste can be easily pumped to the packing station.

In accordance with the invention, there is provided a cold process method for forming a pumpable, oven stable, pectin based fruit paste. The term "paste" means filling, toppings, etc. This method comprises providing an unheated liquid component or phase containing pectin and a food ingredient. The cold liquid component has a temperature of less than 130° F. and a solid content of over 55%. The temperature is preferably in the range of 110–120° F. The pectin is solubilized in the cold liquid component. Buffer salt prevents gelling. There is also provided a low free water component or phase referred to as a "dry" phase. The dry phase or component contains a gelling agent for the solubilized pectin, granulated dry acid and granulated buffer salt. The buffer salt controls the rate at which the pH is lowered. The two phases are rapidly blended while preventing the gelling of the pectin to form a blended, low viscosity ungelled formulation. This low viscosity formulation is transported to a storage container where it is gelled into a bake stable spread for subsequent use in producing a baked fruit product. The acid and buffer salt are solubilized by water in the liquid phase to delay gelling of the pectin for a time necessary to blend and pump the formulation into a storage container. In the preferred embodiment, the blending is by a high speed mechanical blender forcing the mixed liquid and dry phases to the storage area in less than 60 seconds. In the preferred implementation of the invention, blending time is in the general range of 5–30 seconds. This produces the bake stable product because it is mixed before it gels. Although a high speed mechanical blender such as disclosed in Zimmerly U.S. Pat. No. 3,606,270 is preferred, the invention can be practiced using other mixing devices, such as a static mixer as shown in FIG. 15 of Rock U.S. Pat. No. 5,932,270. This patent is incorporated by reference herein. The static mixer is used for the liquid to liquid implementation of the invention.

In accordance with the invention, when the solubilized pectin is a low methoxyl pectin, the gelling agent is a calcium source having a release controlled by the dry buffer salt and dry acid. When the pectin is a high methoxyl pectin, the gelling agent is acid in combination with the high solids content of the mixed liquid and dry phases. Again, the buffer salt controls the rate of pH decrease caused by solubilization of the dry acid during the blending operation. In either instance, the gelling of the pectin is delayed until the blending or mixing has been accomplished to fix the structure of the paste. The low viscous, ungelled formulation is pumped into the packing or storage container for subsequent gelling. The bake stability is accomplished by the rapid blending before the onset of gelling.

In the preferred aspect of the invention, the food ingredient is a fruit puree. The temperature of the liquid component is maintained in the general range of 110–120° F. Basically, the liquid phase is not heated. The solids content of this phase is in the general range of 60%–75%. The dry acid in the low free water component or dry phase has a particle size in the general range of 149–590 microns. The buffer salt in this same dry phase has a particle size in the general range of 44–590 microns. The particle size is adjusted to control the rate of change of the pH during the blending or mixing operation. This delays gelling until the internal structure is finalized.

In accordance with another aspect of the invention, an additional stabilizer such as cold water swelling starch, is added to the formulation, preferably in the dry phase.

In accordance with another aspect of the invention, additional stabilizers, such as microcrystalline cellulose, carboxyl methy cellulose or apple powder is added to the formulation, preferably in the liquid phase.

In accordance with another aspect of the invention, there is provided a bake stable food paste with a total range of 60%–75%, a water activity in the general range of 0.50–0.80 and pH in the general range of 3.0–5.0. This paste contains pectin and is gelled after rapid mixing of the constituents of the paste in a time less than 60 seconds while the paste is subjected to a temperature not exceeding 130° F. Preferably, the temperature of the paste does not exceed 120° F. and is preferably in the general range of 110–120° F. during the cold processing.

The primary object of the present invention is the provision of a cold process method for forming a pumpable oven stable pectin based food paste.

Another object of the present invention is the provision of a cold process method, as defined above, which cold process method utilizes two phases, one of which includes a pectin and the other includes a pectin gelling agent. These two phases are blended together in a time less than 60 seconds to produce a low viscous, non gelled formulation that is pumped into a storage or packing container for subsequent gelling. The structure is established before subsequent gelling of the pectin.

Yet a further object of the present invention is the provision of a cold process method, as defined above, which cold process method allows the production of a bake stable food paste by a process that is not heated beyond 130° F., but has a low viscosity allowing efficient pumping through the equipment performing the method.

Still a further object of the present invention is the provision of a cold process method, as defined above, which cold process method allows the use of a pectin stabilizing system without requiring heat and cooling operations.

Yet another object of the present invention is the provision of a bake stable, pectin food paste that is processed by cold process method.

These and other objects and advantages will become apparent from the following description taken together with the accompanying drawings.

PREFERRED EMBODIMENT

Figure 1:
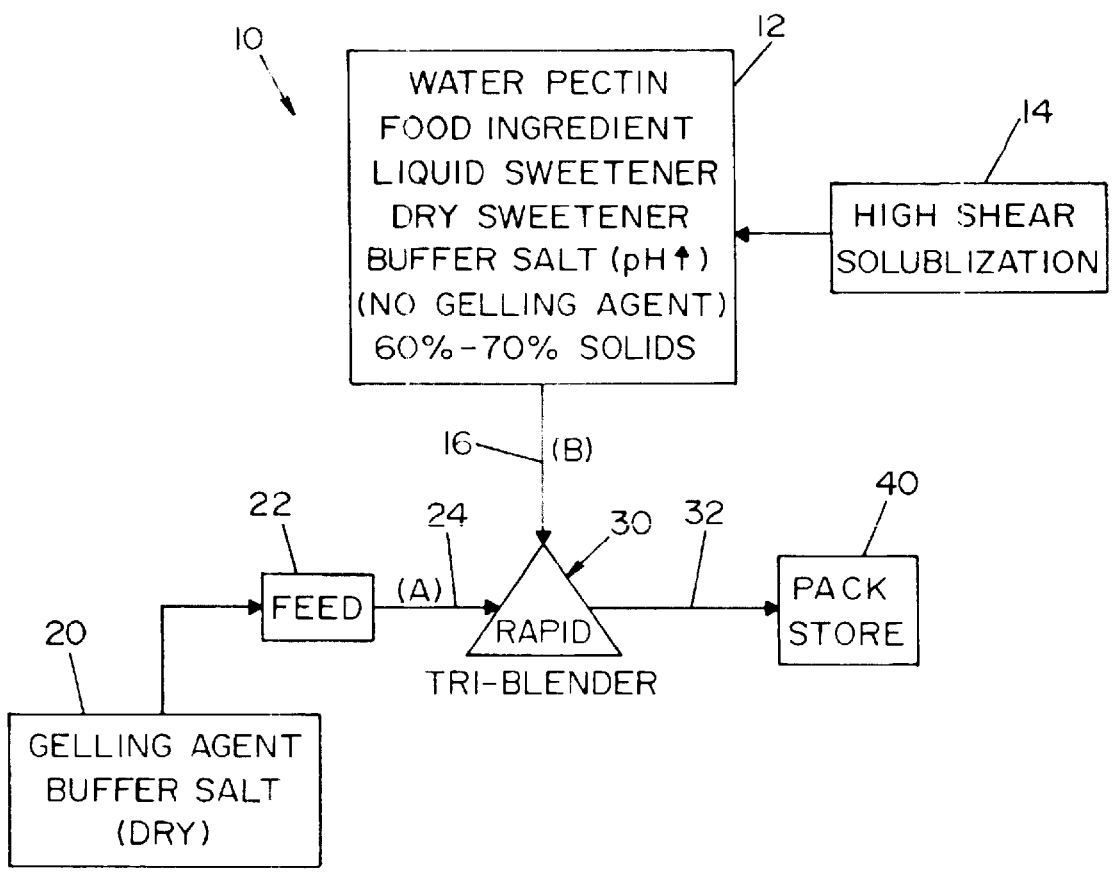
FIG. 1 is a block diagram showing the basic steps used in performing the cold process method of the present invention.
Figure 2:
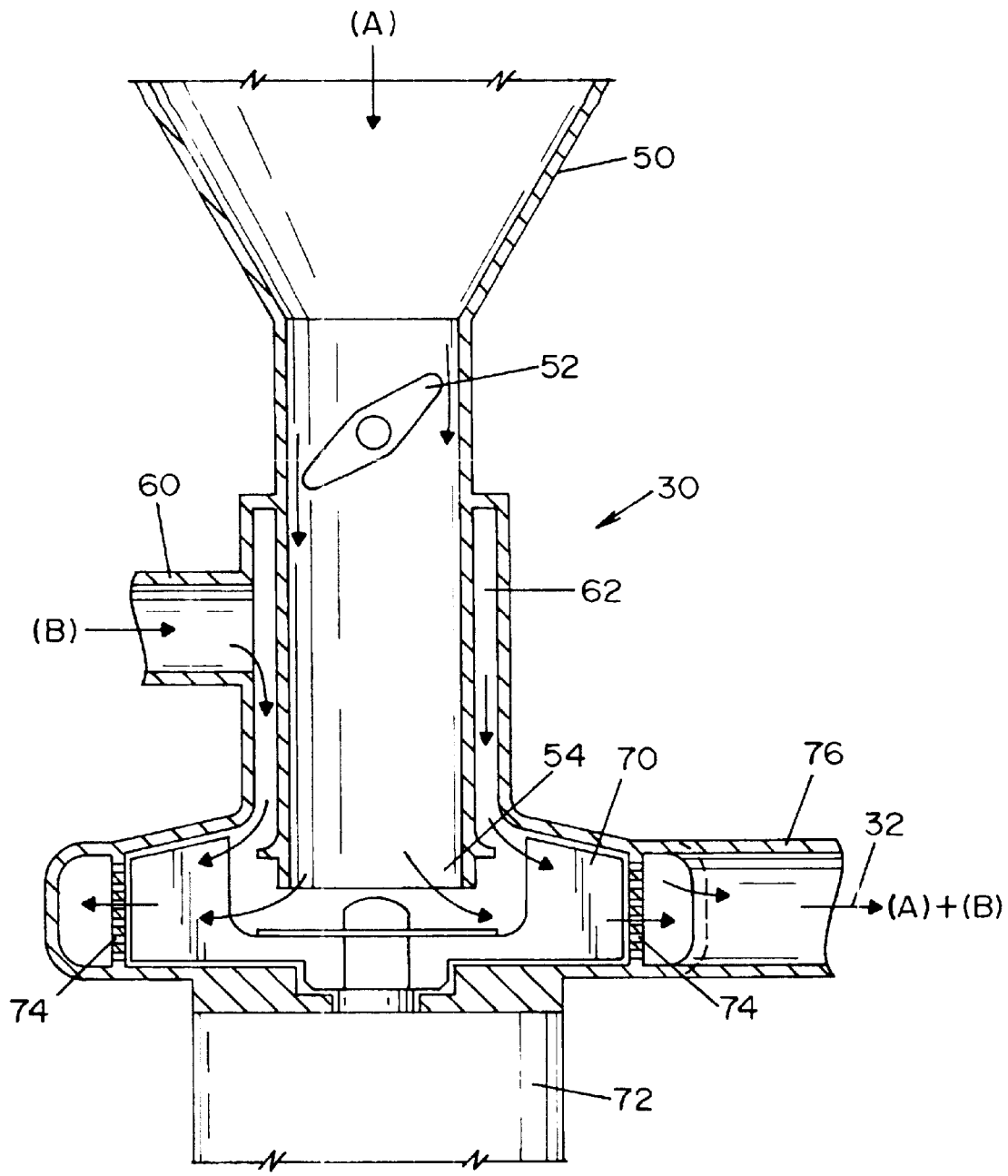
FIG. 2 is a cross-sectional view of the rapid mechanical blender used in accordance with the preferred embodiment of the present invention.

Referring now to the drawings wherein the showings are for the purpose of illustrating preferred embodiment only and not for the purpose of limiting same, FIG. 1 shows a cold processing method as previously explained in detail. The introductory disclosure is incorporated in method 10. Liquid phase 12 includes water, a pectin, a food ingredient, such as fruit puree, liquid sweetener, dry sweetener and a buffer salt to increase the pH value of the liquid phase. This allows dissolution of the pectin without gelling. There is no gelling agent, but the solids are in the general range of 60%–70%. A high shear drive 14 solubilizes the pectin whether it is low or high DE, so that the liquid phase B passing through line 16 is a pectin ready for activation when exposed to a gelling agent. As is known, the gelling agent is acid when the pectin has a high DE and is calcium ions for cross linking when the pectin has a low DE. Of course, high methoxyl pectin also requires solids above about 50%. The liquid phase with pectin ready to be gelled is pumped through line 16. Dry phase 20 includes a gelling agent and a dry buffer salt is fed by gravimetric feeder 22 as a dry phase A passing through line 24. Tri-blender 30, as best shown in FIG. 2, rapidly blends the liquid phase or component 12 in line 16 with the dry phase or component 20 in line 24. The blending takes place for a time less than 60 seconds. Preferably the blending time is less than 45 seconds. In practice, the blending operation is performed in a time of 5–30 seconds to give a low viscosity, ungelled formulation or mass in output line 32, which formulation is directed to the packing or storage container 40 for shipment to the ultimate user. FIG. 1 illustrates the broad aspect of the present invention. A pectin stabilized, bake stable paste is produced by rapidly mixing to fix the internal structure of the paste before it starts to gel. This gives bake stability using cold processing. The constituents of phase 12 and phase 20 are selected as previously described to prevent gelling of the formulation before it is pumped through line 32 as a low viscosity liquid. The pectin is solubilized in phase B. Then the pectin is subjected to a gelling agent but gelling is delayed to blend, transfer and, then, gel. To blend phases A and B, they are directed simultaneously and continuously to an ultra high speed blender 30 of the type schematically illustrated in FIG. 2 and shown in more detail in Zimmerly U.S. Pat. No. 3,606,270, incorporated by reference herein. Ultra high speed blender 30 disperses the dry component A into a liquid phase or component B before the gelling agent in phase A has time to gel the pectin. The invention involves the rapid dispersion of component A in liquid phase B before the pectin can start to gel. Thus, it is necessary to maintain a low water content in the dry phase A so that it remains dry or at least substantially free of available water until mixed or blended with the liquid phase. Then the mix includes agents to delay gelling until after transport to a storage container. The blended material as shown in FIG. 1 is pumped through line 32 to packing station 40 where the paste is ultimately finalized by gelling of the pectin after a full and thorough dispersion of the blend of components A in the liquid phase or component B. Ultra high speed blender 30 as shown in FIG. 2 includes a hopper 50 to receive dry component A. The blender may include a butterfly valve 52 controls the flow of the dry phase to outlet 54. The liquid phase is introduced through inlet 60 into an annular passage 62. In this manner, dry component A is directed together with liquid component B to a rapidly rotating impeller 70 driven by motor 72. The two components are immediately forced outwardly through a fine mesh screen 74 into a pressurized outlet 76 connected to line 32, as shown in FIG. 1. The ultra rapid blender or mixer 30 is a "tri-blender" that disperses powder or dry component A into the liquid component B at a high speed. In accordance with the invention, the blending occurs and the structure of the paste is established in less than 60 seconds. In this manner, gelling later merely locks the treated internal structure obtained during rapid blending at high power. In practice, the full blending is accomplished in approximately 5–10 seconds. The preferred time of the rapid full blending is 5–30 seconds. As the grain size of the dry buffer salt decreases, or the grain size of the acid increases, a greater blending time is created. This delay is due to the reduction in the rate of decrease in pH by the solubilizing of the acid controlled by the salt. The rate at which the calcium ions are released from the calcium source is also controlled by the relationship of pH controlled by relationship of the acid particles and the salt particles. The acid and buffer salt are coordinated to assure that the pectin does not gel until the dry and liquid phases are thoroughly blended and pumped through lines 32 to container or packing station 40.

Figure 3:
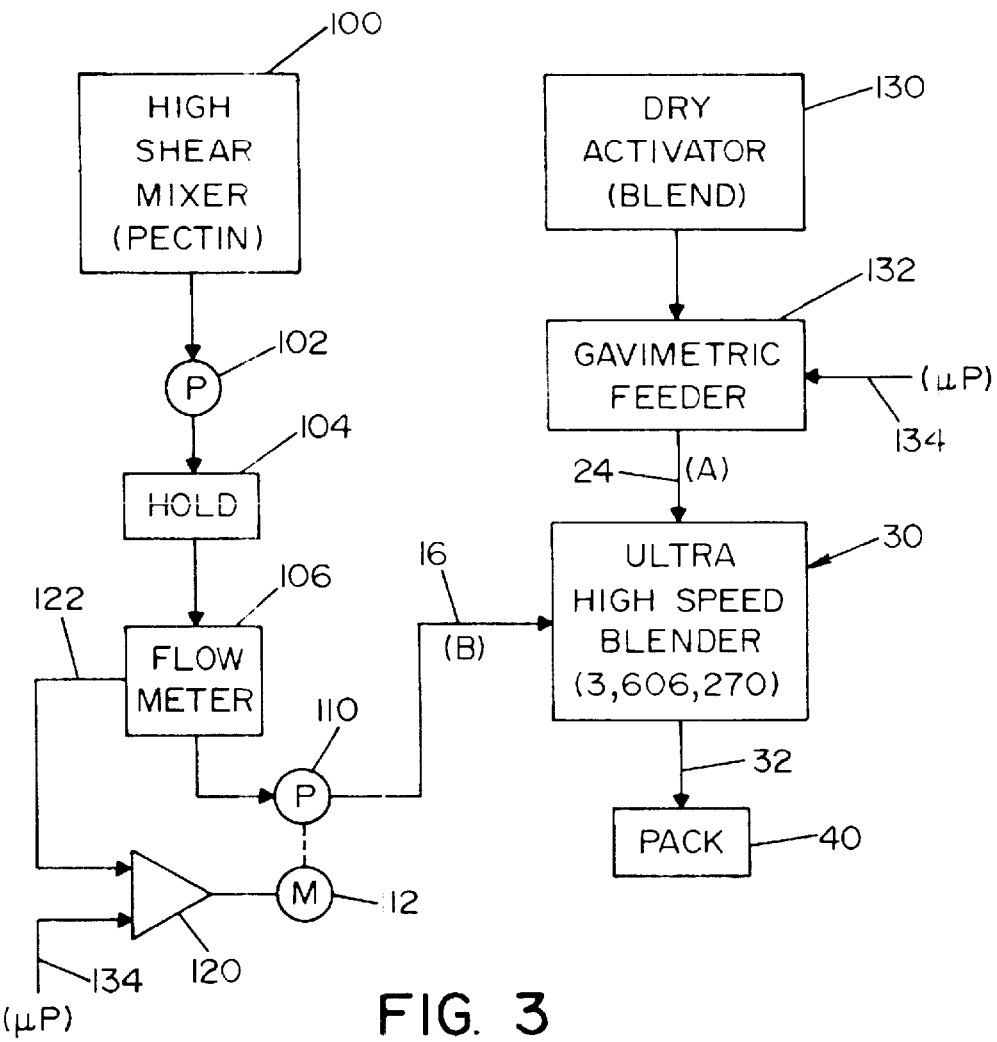
FIG. 3 is a block diagram showing operating procedures and representative equipment used in practicing the present invention.
Figure 3A:
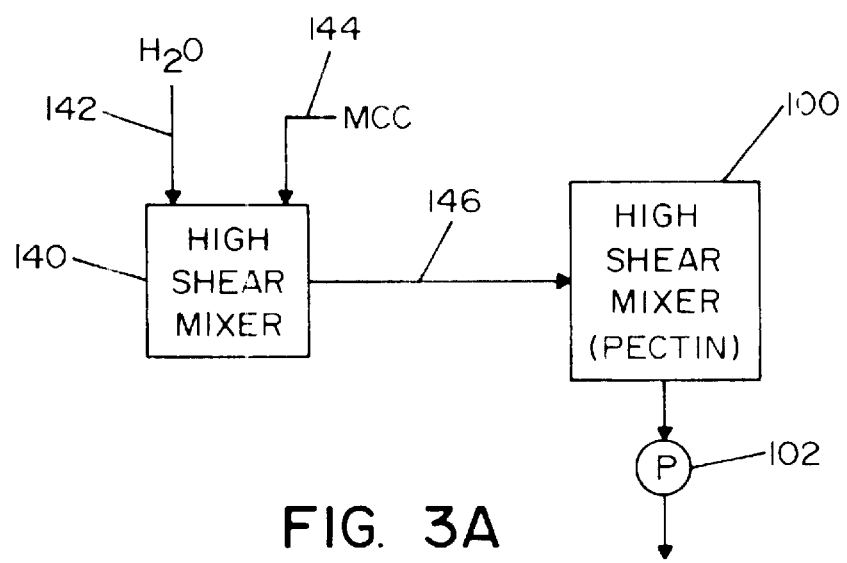
FIG. 3A is a partial block diagram illustrating an addition to the disclosed cold process and representative equipment shown in FIG. 3.

The representative equipment used in practicing the method 10 of FIG. 1 is illustrated in FIG. 3 wherein a high shear mixer 100 mixes the pectin with the other constituents to produce liquid phase 12. This phase is forced through pump 102 to a holding tank 104. Flow meter 106 measures the rate at which pump 110 forces liquid phase B into high speed blender 30 through line 16. The flow rate is controlled by motor 112 under direction of error amplifier 120. The actual flow measured by meter 106 is a voltage signal in line 122. A voltage signal in line 134 from the system controlling microprocessor indicates the rate at which pump 10 is to deliver liquid phase to blender 30. Dry blender 30 mixes the dry phase that is directed through gravimetric feeder 132 under the control of the voltage signal in line 134 from the system controlling microprocessor. Thus, the volume of dry phase in line 24 is correlated with the volume of liquid phase in line 16. In accordance with an option in practicing the invention, various supplemental stabilizers can be employed. As disclosed in Rock U.S. Pat. No. 5,932,270, incorporated by reference herein, one of the stabilizers for the oven stable paste is microcrystalline cellulose (MCC). In FIG. 3A, the cellulose in line 144 is mixed with water in line 142 by a high shear mixer 140 so that the cellulose is masticated into small strands. These strands, with the processing water decreased, are directed through line 146 to the high speed mixer 100 for the liquid phase. Other stabilizers, such as cold setting starch, other cellulose and gums can be used without departing from the present invention.

Figure 4:
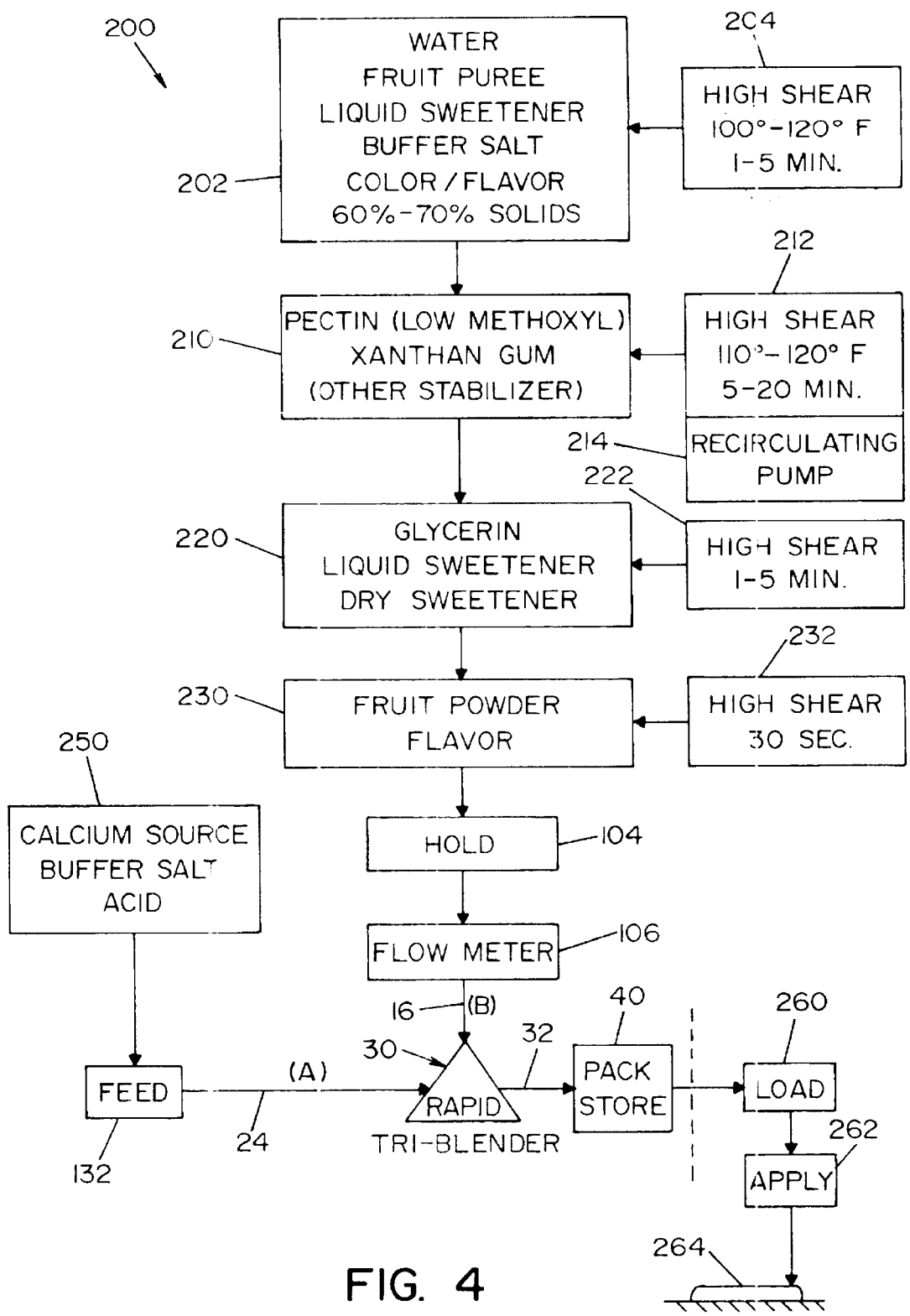
FIG. 4 is a block diagram of one embodiment of the present invention.

One example of the present invention is illustrated in Table I and is cold processed as illustrated generally in FIG. 4.

TABLE I

| Ingredient | % Use Level (w/w) | % Solids |
| --- | --- | --- |
| Liquid Phase (B) | | |
| High Fructose Corn Syrup | 37.5 | 30.00 |
| Fruit Puree | 05.63 | 01.74 |
| Color | 00.02 | 00.02 |
| Buffer Salt | 00.30 | 00.30 |
| Water | 06.48 | 00.00 |
| Low Methoxyl Pectin | 00.80 | 00.80 |
| Xanthan Gum | 00.05 | 00.05 |
| Glycerin | 02.00 | 02.00 |
| High Fructose Corn Syrup | 07.00 | 05.60 |
| Dry Sweetener | 18.40 | 18.40 |
| Corn Syrup | 13.00 | 10.40 |
| Fruit Powder | 00.50 | 00.50 |
| Flavor | 00.92 | 00.00 |
| Dry Phase (A) | | |
| Modified Food Starch | 05.20 | 05.20 |
| Acid | 01.00 | 01.00 |

TABLE I-continued

| Ingredient | % Use Level (w/w) | % Solids |
| --- | --- | --- |
| Maltodextrin | 00.60 | 00.60 |
| Calcium Source | 00.30 | 00.30 |
| Buffer Salt | 00.30 | 00.30 |
| TOTAL | 100.00% | 77.21% |

The example shown in Table I is processed as previously described. The corn syrup, fruit puree, color, and buffer salt is mixed for one minute at a temperature of 120° F. The low methoxyl pectin and supplemental stabilizer in the form of xanthan gum is mixed for ten minutes with a high shear and recirculating shear pump to assure solubilization of the pectin. Thereafter, glycerin, more corn syrup and a dry sweetener is added and mixed for three minutes with a high shear mixer. At the end of the process for the liquid phase, corn syrup, fruit powder and flavoring is mixed for thirty seconds with a high shear mixer. This produces the liquid phase B as shown in Table I. Dry phase A involves combining the supplemental stabilizer cold setting starch, the dry acid, the maltodextrin, and the calcium source with the dry buffer salt to form the dry component or phase. These two phases are combined as previously described. This procedure is set forth generally in FIG. 4.

Referring now to FIG. 4, the example of Table II is processed by the cold process method 200 wherein the main liquid ingredients are mixed as indicated by block 202 using high shear mixer 204. Temperature is maintained in the general range of 110–120° F. There is no added heat. The mixing occurs for approximately 1–5 minutes. As indicated by block 210, the pectin and supplemental stabilizer in the form of xanthan gum is added to the high solids liquid from block 202. This combination is mixed by a high shear mixer 212 for 5–20 minutes to assure solubilization of the pectin. The buffer salt allows solubilization without gelling that could occur in the high solids liquid, if the pH should drop. This could happen due to the acid in the fruit puree. A recirculating pump 214 is also used in this step to assist in this rapid agitation for activating the pectin to be subsequently gelled. Solubilizing pectin in a high solids liquid is a feature of the invention. The buffer salt prevents pre-gelling. This cold process constitutes an essential aspect of the invention by forming a liquid phase with solubilized pectin that is not gelled. However, in the example of Table I additional ingredients, as shown in block 220, are then added to the liquid phase. High shear mixer 222 acts on the total liquid phase for another 1–5 minutes. Thereafter, a small addition of flavoring and fruit powder is introduced at block 230. High shear mixer 232 continues to mix the liquid phase for about another 30 seconds. The homogeneous liquid phase is then directed to holding tank 104. As previously described, the rate of movement of the liquid phase is measured by flow meter 106. The calcium source, buffer salt, dry acid and starch form the low free water component of "dry" phase indicated by block 250. Since the pectin in the liquid phase is low methoxyl, a calcium source is required for gellation. The rate of release of the calcium source is controlled by particle size of the buffer salt and compared with the particle size of the dry acid. The salt and acid delays action of the calcium ions for at least 60 seconds after the liquid phase is added to the dry phase. The blending is done in less than 45 seconds. Thus, ungelled, low viscosity material is stored in container 40. The container is shipped to the location for ultimate use. The stable paste is loaded into a bin evacuation system, as indicated by block 260, for application as indicated by block 262 onto a food item 264 to be subsequently baked.

Figure 5:
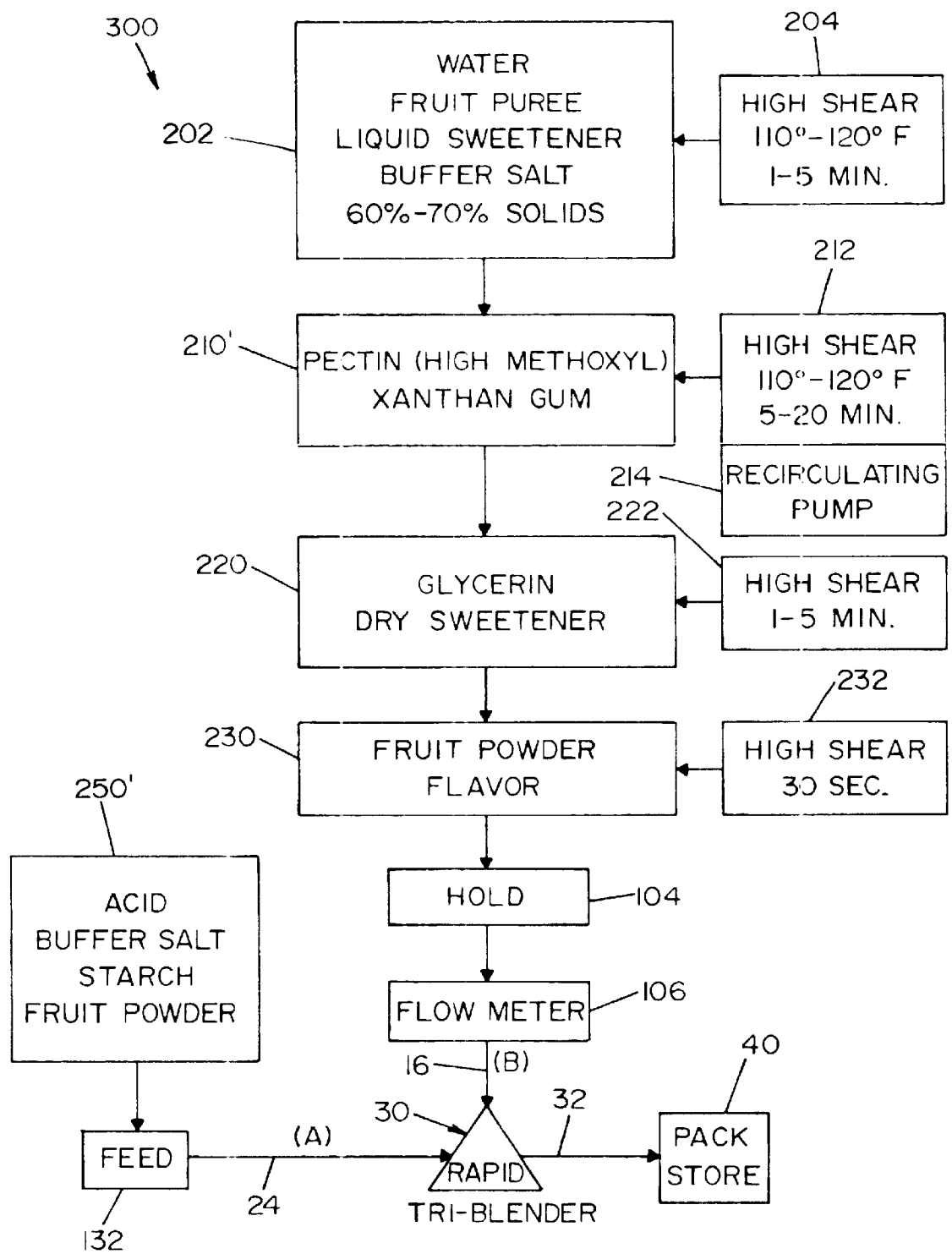
FIG. 5 is a block diagram of a second embodiment of the present invention.

The second example of the present invention is shown in Table II and illustrated in FIG. 5.

TABLE II

| Ingredient | % Use Level (w/w) | % Solids |
|---|---|---|
| Liquid Phase (B) | | |
| High Fructose Corn Syrup | 37.80 | 30.24 |
| Fruit Puree | 04.00 | 01.23 |
| Color | 00.02 | 00.02 |
| Buffer Salt | 00.23 | 00.23 |
| Water | 10.28 | 00.00 |
| High Methoxyl Pectin | 01.00 | 01.00 |
| Xanthan Gum | 00.05 | 00.05 |
| Glycerin | 02.00 | 02.00 |
| Dry Sweetener | 19.35 | 19.35 |
| Corn Syrup | 14.00 | 11.20 |
| Fruit Powder | 01.50 | 01.50 |
| Flavor | 00.92 | 00.00 |
| Dry Phase (A) | | |
| Modified Food Starch | 06.12 | 06.12 |
| Acid | 01.00 | 01.00 |
| Fruit Powder | 01.50 | 01.50 |
| Buffer Salt | 00.23 | 00.30 |
| TOTAL | 100.00% | 75.74% |

Figure 6:
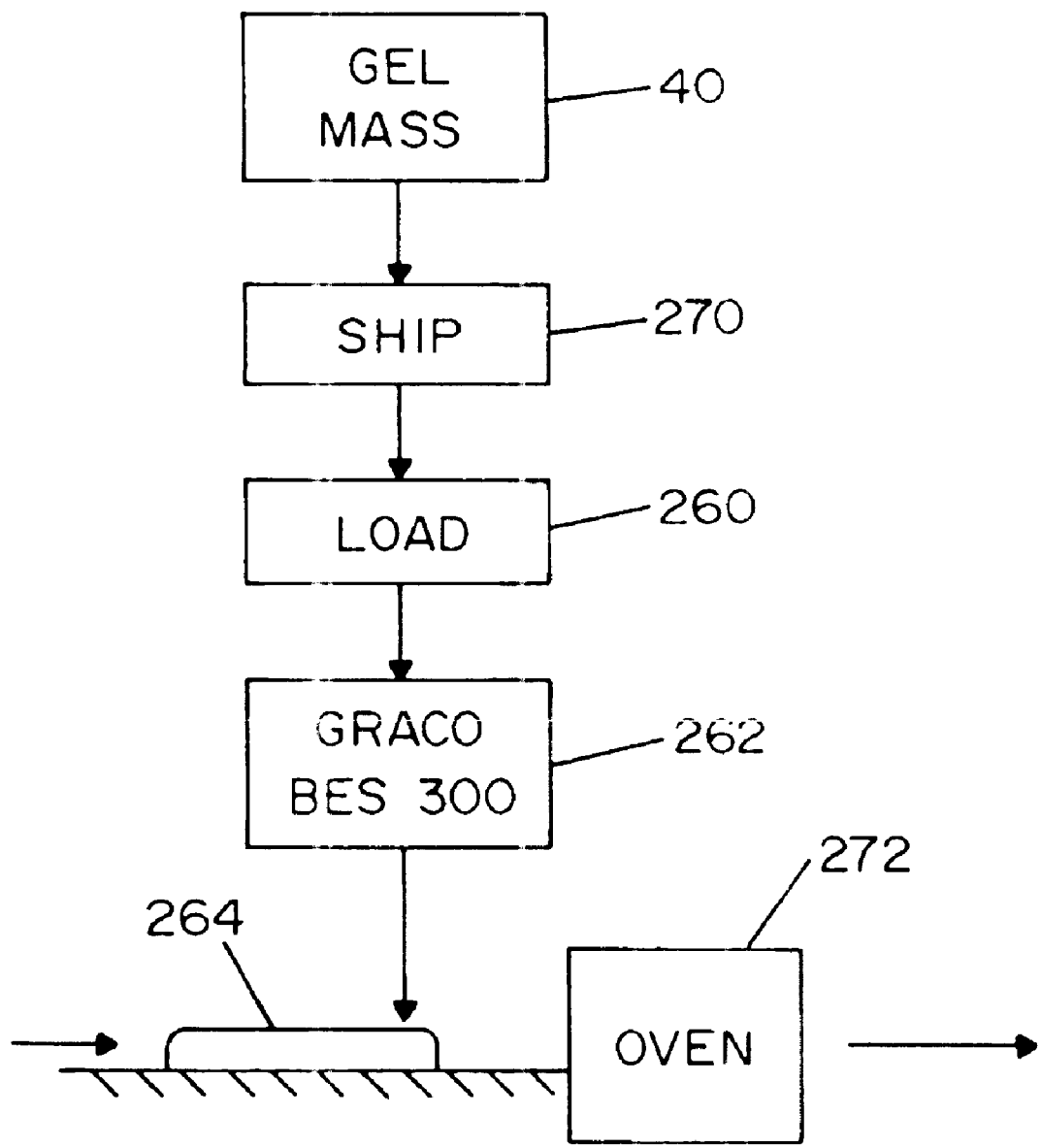
FIG. 6 is a simplified block diagram showing the use of the paste made by the cold process of the present invention.

Cold process method 300 of FIG. 5 is used to implement the example shown in Table II. Method 300 differs from method 200 of FIG. 4 only by using high methoxyl pectin, as shown in block 210'. When using this type of pectin, the dry phase, as shown in block 250' is modified by removing the calcium source and replacing this gelling agent with acid to gel the pectin. In this particular embodiment, a starch is also added to the dry phase to provide a further stabilizing system for the formulated material pumped through line 32 to container 40. The pectin is gelled after a delay of over 60 seconds so the paste structure is established before gelling. The buffer salt controls the pH decrease to delay gelling. FIG. 6 shows the gelled paste in container 40 which is shipped as indicated by block 270. A bin evacuation system sold as a Graco BES 300 is illustrated at block 262. This device pumps and deposits the paste to the dough in the bake process. An oven 272 bakes the food item 264 after the bake stable paste is applied by the bin evacuation system 262.

Figure 7:
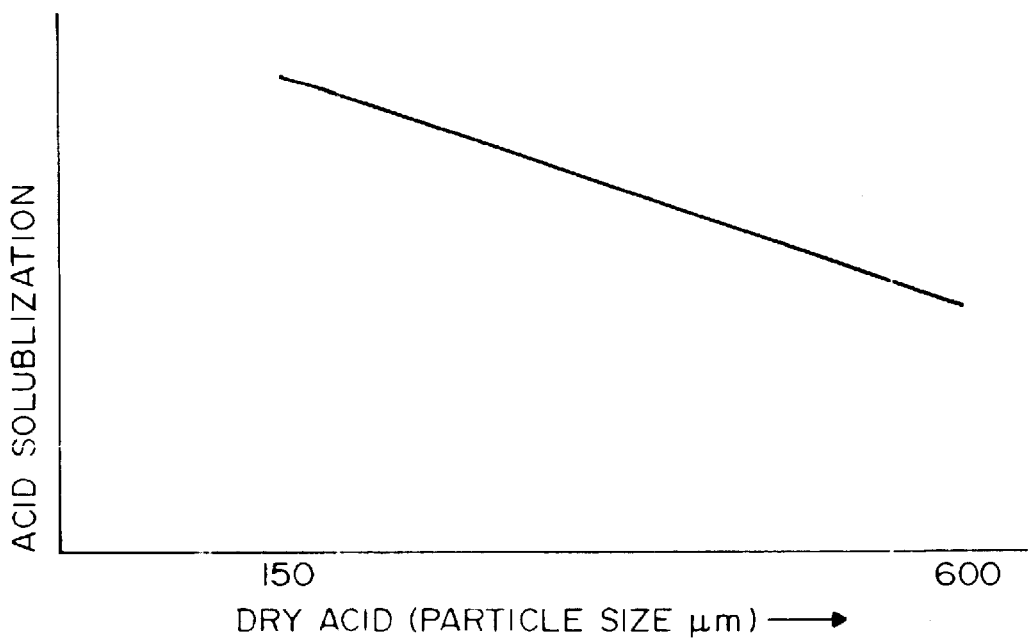
FIGS. 7 and 8 are graphs generally illustrating the solubilization rate concept for the dry acid and the dry buffer salt in the low free water phase, i.e. "dry" phase of the invention; and, FIG. 9 is a combined block diagram and cross section drawing of a method using two liquid phases with a static mixer.
Figure 8:
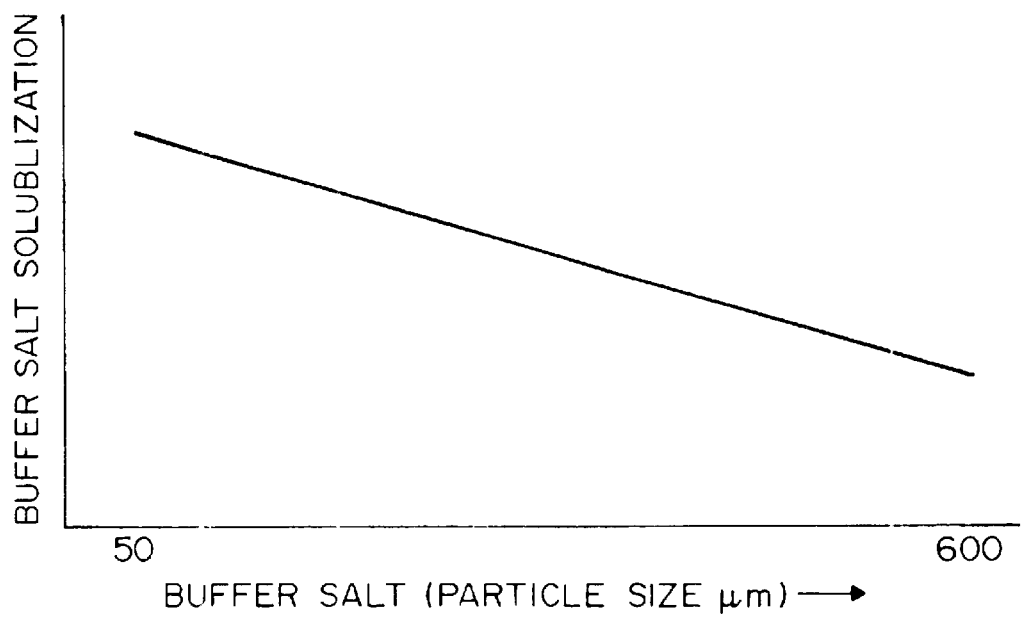

As discussed previously, the particle size of the dry acid and the particle size of the buffer salt are coordinated to prevent gelling for a desired time, in practice over 60 seconds. Thus, the paste is formulated and stored before it is gelled. As shown in FIGS. 7 and 8, both the dry acid and buffer salt are more active as particle size is decreased. By reducing the particle size of the buffer salt, the acid reacts less rapidly. The acid also reacts less rapidly by increasing its particle size. But, the acid must gel the pectin when it is stored. Thus, by adjusting the particle size of the dry acid and the dry salt the release of calcium ions and/or the decrease in the pH necessary for gelling the pectin is controlled in the realm of time. In this manner, the liquid and dry phases, when blended together do not gel until they are thoroughly mixed to their final composition by high speed blender 30 to set the internal structure. This fixed structure gives the bake stability and allows cold processing of a pectin stabilized food paste. Of course, paste could also be a non-fruit flavor, such as chocolate or caramel. In these pastes, the pectin still provides the stabilizing system.

Figure 9:
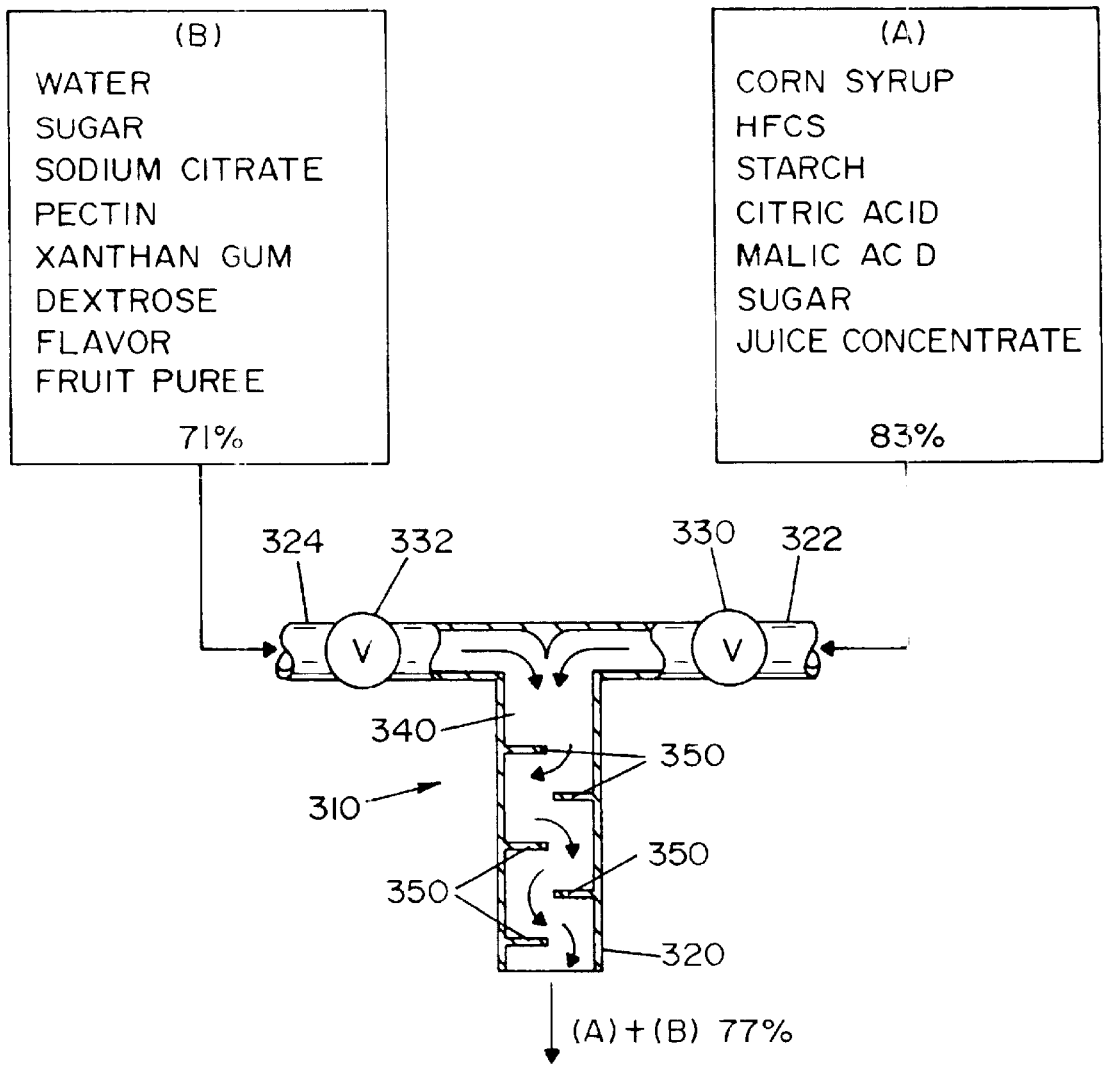

An alternative method of producing a fruit paste is shown in FIG. 9. Components A and B are both liquid phases. The ultra high speed blender 30 is replaced with a static blender 310. Component B includes high methoxyl pectin in a low solids liquid, illustrated as 71% solids, this component is cold process generally as disclosed in FIGS. 4 and 5. In this prior example, the granulated acid in the "dry" component controlled the rate at which the pH was lowered to activate the pectin. In the cold process of FIG. 9, the second component A is liquid with a high solids content, illustrated as 83% solids. The granulation of the acid in this second liquid phase controls the rate at which the pH is lowered to delay pectin gelling when phases A and B are mixed by static blender 310. The acid is dispersed in the very high solids environment. The high solids of phase A prevents the acid from solubilizing until it is combined with phase B, the lower solids liquid phase. At this point the acid begins to dissolve and the pH is gradually lowered thereby activating the pectin. Depending on the acid granulation and temperature, the acid itself will dissolve at a greater or lesser rate when the two liquid phases combine. Combining the low brix phase B with the high brix phase A produces a high solids (77%) to outlet 320 of mixer 310. A variety of static mixers could be used; however, representative mixer 310 has inlets 322, 324, respectively. Valves 330, 332 control the ratio of phases A and B. The two phases are maintained separately from each other until mixing acid 340. A plurality of axially spaced baffles 350 rapidly mix the phases in the same manner as the rapid dispersion occurring in blender 30. Other designs of mixing devices can be used including ultra high speed mixers. The use of two liquid components allows continuous processing of this novel pectin paste.

As previously described, "solubilization" of pectin is a process where the pectin is dispersed and begins to swell while its molecules individualize. This action activates the pectin whether using a cold process or a hot process. The key to the present invention is to solubilize the pectin in a high solid content without heat. This does not use excess water or energy. The buffer salt prevents any pre-gelling. If the pH is inherently high in the liquid phase as in caramel or chocolate, buffer salt is not used. The pectin dissolves in the liquid sweeteners constituting the high percentage of solids. Thus, in the invention, the pectin is dissolved in the high solids liquid of the liquid phase awaiting activation by the gelling agent in the dry phase. The use of a buffer salt in the liquid phase assures that the hydrogen ions in the fruit puree do not react with the dissolved pectin to cause gelling in the liquid phase. Consequently, the use of the buffer salt in the liquid phase raises the pH of the liquid phase to prevent the pectin from gelling even when it is a high methoxyl pectin. In accordance with the invention, there is no gelling of the dissolved pectin in the liquid phase. This is accomplished by maintaining a high pH with the use of buffer salt. Turning now to the dry phase. The particle size of the acid determines how fast the dry acid dissolves into the liquid phase to decrease the pH of the combined phases. Lower particle size causes faster dissolution of the acid, i.e. faster solubilization. This can cause rapid start of the gelling action. As previously described, by adjusting the size of the acid particle size and coordinating them with the size of the dry buffer salt particles, the pectin does not gel until it reaches storage container 40. This allows low viscosity throughout the total cold processing defined as methods 10, 200 and 300. Mixing completes the paste structure before the pectin starts to gel. Any pre-gelling is prevented. Such pre-gelling increases the viscosity and reduces the bake stability of the end product because the structure of the paste is not fixed before the gel starts. When the release of calcium ions is necessary to cause gelling, the pH must be reduced by the acid in the dry phase. The low pH assists in the dissolving of the calcium ions that are released into the paste. The buffer salt holds the pH high and controls the rate at which the pH is lowered by dissolution of the dry acid. Correlation of these two items, as previously mentioned, is used to prevent gelling of the cold process material until after it has been thoroughly mixed by the high speed power blender and is stored.

Having thus defined the invention, the following is claimed:

1. A cold process method for forming a pumpable, bake stable, pectin based food paste, said method comprising:
   (a) providing a liquid component containing solubilized pectin and a food ingredient, said liquid component having a temperature of less than 130° F. and a solids content of over 55%;
   (b) providing a low free water component containing a gelling agent for said pectin, dry acid and a buffer salt;
   (c) rapidly blending said dry component into said liquid component while preventing gelling of said pectin to form a blended, low viscosity gelled formulation;
   (d) transporting said blended low viscosity ungelled formulation to a storage package where it gels into said bake stable food spread.

2. A method as defined in claim 1 wherein said solubilized pectin is a low methoxyl pectin and said gelling agent is a calcium source.

3. A method as defined in claim 1 wherein said solubilized pectin is a high methoxyl pectin and said gelling agent is an acid combined with high solids content.

4. A method as defined in claim 3 wherein said food ingredient is a fruit product.

5. A method as defined in claim 4 wherein said fruit product is a fruit puree.

6. A method as defined in claim 2 wherein said food ingredient is a fruit product.

7. A method as defined in claim 6 wherein said fruit product is a fruit puree.

8. A method as defined in claim 1 wherein said food ingredient is a fruit product.

9. A method as defined in claim 8 wherein said fruit product is a fruit puree.

10. A method as defined in claim 9 wherein said temperature of said liquid component is in the general range of 110–120° F.

11. A method as defined in claim 8 wherein said temperature of said liquid component is in the general range of 110–120° F.

12. A method as defined in claim 7 wherein said temperature of said liquid component is in the general range of 110–120° F.

13. A method as defined in claim 6 wherein said temperature of said liquid component is in the general range of 110–120° F.

14. A method as defined in claim 5 wherein said temperature of said liquid component is in the general range of 110–120° F.

15. A method as defined in claim 4 wherein said temperature of said liquid component is in the general range of 110–120° F.

16. A method as defined in claim 3 wherein said temperature of said liquid component is in the general range of 110–120° F.

17. A method as defined in claim 2 wherein said temperature of said liquid component is in the general range of 110–120° F.

18. A method as defined in claim 1 wherein said temperature of said liquid component is in the general range of 110–120° F.

19. A method as defined in claim 18 wherein said solids content is in the general range of 60%–75%.

20. A method as defined in claim 17 wherein said solids content is in the general range of 60%–75%.

21. A method as defined in claim 16 wherein said solids content is in the general range of 60%–75%.

22. A method as defined in claim 3 wherein said solids content is in the general range of 60%–75%.

23. A method as defined in claim 2 wherein said solids content is in the general range of 60%–75%.

24. A method as defined in claim 1 wherein said solids content is in the general range of 60%–75%.

25. A method as defined in claim 22 wherein said acid in said low free water component is dry acid.

26. A method as defined in claim 25 wherein said acid has a particle size in the general range of 149–590 microns.

27. A method as defined in claim 26 wherein said particle size of 60% of said dry acid is in the general range of 250–500 microns.

28. A method as defined in claim 16 wherein said acid in said low free water component is dry acid.

29. A method as defined in claim 28 wherein said acid has a particle size in the general range of 149–590 microns.

30. A method as defined in claim 5 wherein said acid in said low free water component is dry acid.

31. A method as defined in claim 30 wherein said acid has a particle size in the general range of 149–590 microns.

32. A method as defined in claim 3 wherein said acid in said low free water component is dry acid.

33. A method as defined in claim 32 wherein said acid has a particle size in the general range of 149–590 microns.

34. A method as defined in claim 33 wherein said buffer salt in said low free water component has a particle size in the general range of 44–590 microns.

35. A method as defined in claim 32 wherein said buffer salt in said low free water component has a particle size in the general range of 44–590 microns.

36. A method as defined in claim 31 wherein said buffer salt in said low free water component has a particle size in the general range of 44–590 microns.

37. A method as defined in claim 30 wherein said buffer salt in said low free water component has a particle size in the general range of 44–590 microns.

38. A method as defined in claim 29 wherein said buffer salt in said low free water component has a particle size in the general range of 44–590 microns.

39. A method as defined in claim 28 wherein said buffer salt in said low free water component has a particle size in the general range of 44–590 microns.

40. A method as defined in claim 26 wherein said buffer salt in said low free water component has a particle size in the general range of 44–590 microns.

41. A method as defined in claim 25 wherein said buffer salt in said low free water component has a particle size in the general range of 44–590 microns.

42. A method as defined in claim 25 wherein said acid is selected from the class consisting of citric acid, malic acid, adipic acid, acetic acid, glucora delta lactone and phosphoric acid.

43. A method as defined in claim 3 wherein said acid is selected from the class consisting of citric acid, malic acid, adipic acid, acetic acid, glucora delta lactone and phosphoric acid.

44. A method as defined in claim 5 wherein said calcium source is selected from the class consisting of calcium citrate, calcium lactate, tricalcium phosphate, dicalcium phosphate, and calcium sulfate.

45. A method as defined in claim 24 wherein a cold water hydrating starch is included in said low free water component as an additional stabilizer that hydrates after said blending operation.

46. A method as defined in claim 22 wherein a cold water hydrating starch is included in said low free water component as an additional stabilizer that hydrates after said blending operation.

47. A method as defined in claim 18 wherein a cold water hydrating starch is included in said low free water component as an additional stabilizer that hydrates after said blending operation.

48. A method as defined in claim 9 wherein a cold water hydrating starch is included in said low free water component as an additional stabilizer that hydrates after said blending operation.

49. A method as defined in claim 8 wherein a cold water hydrating starch is included in said low free water component as an additional stabilizer that hydrates after said blending operation.

50. A method as defined in claim 7 wherein a cold water hydrating starch is included in said low free water component as an additional stabilizer that hydrates after said blending operation.

51. A method as defined in claim 6 wherein a cold water hydrating starch is included in said low free water component as an additional stabilizer that hydrates after said blending operation.

52. A method as defined in claim 3 wherein a cold water hydrating starch is included in said low free water component as an additional stabilizer that hydrates after said blending operation.

53. A method as defined in claim 2 wherein a cold water hydrating starch is included in said low free water component as an additional stabilizer that hydrates after said blending operation.

54. A method as defined in claim 1 wherein a cold water hydrating starch is included in said low free water component as an additional stabilizer that hydrates after said blending operation.

55. A method as defined in claim 54 including adding masticated cellulose in said liquid component.

56. A method as defined in claim 24 including adding masticated cellulose in said liquid component.

57. A method as defined in claim 18 including adding masticated cellulose in said liquid component.

58. A method as defined in claim 9 including adding masticated cellulose in said liquid component.

59. A method as defined in claim 8 including adding masticated cellulose in said liquid component.

60. A method as defined in claim 7 including adding masticated cellulose in said liquid component.

61. A method as defined in claim 6 including adding masticated cellulose in said liquid component.

62. A method as defined in claim 3 including adding masticated cellulose in said liquid component.

63. A method as defined in claim 2 including adding masticated cellulose in said liquid component.

64. A method as defined in claim 1 including adding masticated cellulose in said liquid component.

65. A method as defined in claim 3 wherein said low free water components is essentially a dry component.

66. A method as defined in claim 2 wherein said low free water components is essentially a dry component.

67. A method as defined in claim 1 wherein said low free water components is essentially a dry component.

68. A method as defined in claim 67 wherein said blending is for a time of less than 60 seconds.

69. A method as defined in claim 68 wherein said time is in the general range of 5–30 seconds.

70. A method as defined in claim 68 wherein said blending is by a high speed mechanical blender.

71. A method as defined in claim 64 wherein said blending is for a time of less than 60 seconds.

72. A method as defined in claim 71 wherein said time is in the general range of 5–30 seconds.

73. A method as defined in claim 64 wherein said blending is by a high speed mechanical blender.

74. A method as defined in claim 54 wherein said blending is for a time of less than 60 seconds.

75. A method as defined in claim 54 wherein said blending is by a high speed mechanical blender.

76. A method as defined in claim 24 wherein said blending is for a time of less than 60 seconds.

77. A method as defined in claim 24 wherein said blending is by a high speed mechanical blender.

78. A method as defined in claim 18 wherein said blending is for a time of less than 60 seconds.

79. A method as defined in claim 18 wherein said blending is by a high speed mechanical blender.

80. A method as defined in claim 8 wherein said blending is for a time of less than 60 seconds.

81. A method as defined in claim 8 wherein said blending is by a high speed mechanical blender.

82. A method as defined in claim 3 wherein said blending is for a time of less than 60 seconds.

83. A method as defined in claim 3 wherein said blending is by a high speed mechanical blender.

84. A method as defined in claim 2 wherein said blending is for a time of less than 60 seconds.

85. A method as defined in claim 2 wherein said blending is by a high speed mechanical blender.

86. A method as defined in claim 1 wherein said blending is for a time of less than 60 seconds.

87. A method as defined in claim 1 wherein said blending is by a high speed mechanical blender.

88. A method as defined in claim 87 including adjusting the particle size of said buffer salt to control the gelling time of said pectin.

89. A method as defined in claim 86 including adjusting the particle size of said buffer salt to control the gelling time of said pectin.

90. A method as defined in claim 67 including adjusting the particle size of said buffer salt to control the gelling time of said pectin.

91. A method as defined in claim 64 including adjusting the particle size of said buffer salt to control the gelling time of said pectin.

92. A method as defined in claim 54 including adjusting the particle size of said buffer salt to control the gelling time of said pectin.

93. A method as defined in claim 24 including adjusting the particle size of said buffer salt to control the gelling time of said pectin.

94. A method as defined in claim 18 including adjusting the particle size of said buffer salt to control the gelling time of said pectin.

95. A method as defined in claim 5 including adjusting the particle size of said buffer salt to control the gelling time of said pectin.

96. A method as defined in claim 4 including adjusting the particle size of said buffer salt to control the gelling time of said pectin.

97. A method as defined in claim 3 including adjusting the particle size of said buffer salt to control the gelling time of said pectin.

98. A method as defined in claim 2 including adjusting the particle size of said buffer salt to control the gelling time of said pectin.

99. A method as defined in claim 1 including adjusting the particle size of said buffer salt to control the gelling time of said pectin.

100. A method as defined in claim 99 including adjusting the particle size of said dry acid to control the gelling time of said pectin.

101. A method as defined in claim 87 including adjusting the particle size of said dry acid to control the gelling time of said pectin.

102. A method as defined in claim 86 including adjusting the particle size of said dry acid to control the gelling time of said pectin.

103. A method as defined in claim 67 including adjusting the particle size of said dry acid to control the gelling time of said pectin.

104. A method as defined in claim 64 including adjusting the particle size of said dry acid to control the gelling time of said pectin.

105. A method as defined in claim 55 including adjusting the particle size of said dry acid to control the gelling time of said pectin.

106. A method as defined in claim 24 including adjusting the particle size of said dry acid to control the gelling time of said pectin.

107. A method as defined in claim 18 including adjusting the particle size of said dry acid to control the gelling time of said pectin.

108. A method as defined in claim 5 including adjusting the particle size of said dry acid to control the gelling time of said pectin.

109. A method as defined in claim 4 including adjusting the particle size of said dry acid to control the gelling time of said pectin.

110. A method as defined in claim 3 including adjusting the particle size of said dry acid to control the gelling time of said pectin.

111. A method as defined in claim 2 including adjusting the particle size of said dry acid to control the gelling time of said pectin.

112. A method as defined in claim 1 including adjusting the particle size of said dry acid to control the gelling time of said pectin.

113. A method as defined in claim 112 including buffer salt in said liquid component to reduce the tendency of said pectin to gel.

114. A method as defined in claim 87 including buffer salt in said liquid component to reduce the tendency of said pectin to gel.

115. A method as defined in claim 86 including buffer salt in said liquid component to reduce the tendency of said pectin to gel.

116. A method as defined in claim 67 including buffer salt in said liquid component to reduce the tendency of said pectin to gel.

117. A method as defined in claim 64 including buffer salt in said liquid component to reduce the tendency of said pectin to gel.

118. A method as defined in claim 55 including buffer salt in said liquid component to reduce the tendency of said pectin to gel.

119. A method as defined in claim 24 including buffer salt in said liquid component to reduce the tendency of said pectin to gel.

120. A method as defined in claim 18 including buffer salt in said liquid component to reduce the tendency of said pectin to gel.

121. A method as defined in claim 5 including buffer salt in said liquid component to reduce the tendency of said pectin to gel.

122. A method as defined in claim 4 including buffer salt in said liquid component to reduce the tendency of said pectin to gel.

123. A method as defined in claim 3 including buffer salt in said liquid component to reduce the tendency of said pectin to gel.

124. A method as defined in claim 2 including buffer salt in said liquid component to reduce the tendency of said pectin to gel.

125. A method as defined in claim 1 including buffer salt in said liquid component to reduce the tendency of said pectin to gel.

126. A bake stable food paste with total solids in the general range of 60%–75%, a water actiyity in the general range of 0.50–0.80 and a pH in the general range of 3.0–5.0, said paste containing pectin gelled after rapid mixing of the constituent of the paste in a time less than 60 seconds and subject to temperatures not exceeding 130° F. during production of the paste.

127. A bake stable food paste with total solids in the general range of 60%–75%, a water activity in the general range of 0.50–0.80 and a pH in the general range of 3.0–5.0, said paste containing pectin gelled after rapid mixing of the constituent of the paste in a time less than 60 seconds and subject to temperatures not exceeding 120° F. during production of the paste.

128. A cold process method for forming a pumpable, bake stable, pectin based food paste, said method comprising:
  (a) providing a liquid component containing solubilized pectin and a food ingredient;
  (b) providing a dry component containing a gelling agent for said pectin, dry acid and buffer salt;
  (c) selecting the particle size of said acid and salt to delay gelling by a desired time;
  (d) rapidly blending said dry component into said liquid component for a time less than a desired time; and,
  (e) transporting said blended components to a vessel where it gels into said food paste after said desired time.

129. A method as defined in claim 128 wherein said solubilized pectin is a low methoxyl pectin and said gelling agent is a calcium source.

130. A method as defined in claim 128 wherein said solubilized pectin is a high methoxyl pectin and said gelling agent is an acid combined with high solids content.

131. A method as defined in claim 128 wherein said cold process is performed at a temperature in the general range of 110–120° F.

132. A method as defined in claim 128 wherein a masticated cellulose is added to said liquid component before it is blended with dry component.

133. A method as defined in claim 128 wherein said blending is by a high speed mechanical blender.

134. A method as defined in claim 128 wherein said desired time is less than 60 seconds.

135. A cold process method for forming a pumpable, bake stable, pectin based food paste, said method comprising:
  (a) providing a first liquid component containing solubilized pectin and a food ingredient, said liquid component having a temperature of less than 130° F. and a low solids content less than 75%;

(b) providing a high solids second liquid component containing a gelling agent for said pectin, and acid with a solids content of over 80%;

(c) rapidly blending said liquid components while preventing gelling of said pectin to form a blended, low viscosity gelled formulation;

(d) transporting said blended low viscosity ungelled formulation to a vessel where it gels into said bake stable food spread.

136. A method as defined in claim 135 wherein said solubilized pectin is a high methoxyl pectin and said gelling agent is an acid combined with high solids content.

137. A method as defined in claim 135 wherein temperatures of said liquid components is in the general range of 110–120° F.

138. A method as defined in claim 135 wherein said solids content is of said low solid component in the general range of 60%–75%.

139. A method as defined in claim 138 wherein said solids content of said high solids component is in the general range of 80–90%.

140. A method as defined in claim 135 wherein said solids content of said high solids component is in the general range of 80–90%.

141. A cold process method for forming a pumpable, bake stable, pectin based food paste, said method comprising:

(a) providing a liquid component containing solubilized pectin and a food ingredient;

(b) providing a second component containing a gelling agent for said pectin;

(c) rapidly blending said dry component into said liquid component for a time less than a desired time; and, (d) transporting said blended components to a vessel where it gels into said food paste after said desired time.

142. A method as defined in claim 141 wherein said solubilized pectin is a low methoxyl pectin and said gelling agent is a calcium source.

143. A method as defined in claim 141 wherein said solubilized pectin is a high methoxyl pectin and said gelling agent is an acid combined with high solids content.

144. A method as defined in claim 141 wherein said cold process is performed at a temperature in the general range of 110–130° F.

145. A method as defined in claim 141 wherein a masticated cellulose is added to said liquid component before it is blended with dry component.

146. A method as defined in claim 141 wherein said blending is by a high speed mechanical blender.

147. A method as defined in claim 141 wherein said desired time is less than 60 seconds.

148. A method as defined in claim 141 wherein said second component is liquid with a solids content over 80%.

149. A cold process method for forming a pumpable, bake stable, pectin based food paste that has less than about 10% spread after being exposed to a temperature of 400° F. for about 10 minutes, said method comprising:

(a) providing a first liquid component containing water and solubilized pectin, said first liquid component having a solid content of at least about 30%, said pectin including low methoxyl pectin, high methoxyl pectin, and mixtures thereof;

(b) providing a second liquid component containing a majority of solids and an acid;

(c) rapidly blending said first and second liquid components together at a temperature of less than about 130° F. to form a homogeneous mass;

(d) removing said homogeneous mass from the mixing process prior to said pectin substantially fully gelling, low viscosity gelled formulation; and, (e) transporting said homogenous mass to a vessel, said homogeneous mass substantially fully gelling in the vessel to form said pumpable, bake stable, pectin based food paste.

150. The method as defined in claim 149, wherein said pectin includes high methoxyl pectin.

151. The method as defined in claim 149, wherein said pectin includes low methoxyl pectin.

152. The method as defined in claim 151, wherein said pectin includes low methoxyl pectin.

153. The method as defined in claim 149, wherein said solid content of said first component is at least about 60%.

154. The method as defined in claim 149, wherein said first component includes a buffer, fruit, flavoring agent, humectant, stabilizer, sweetener, and mixtures thereof.

155. The method as defined in claim 154, wherein said first component includes a buffer to inhibit gelling of said pectin prior to the blending of said first mid second liquid components.

156. The method as defined in claim 149, including the step of agitating said pectin in water at a temperature below about 160° F. for up to about 20 minutes to substantially solubilize said pectin in said water.

157. The method as defined in claim 149, wherein said acid in said second component has an average particle size of less than about 590 microns.

158. The method as defined in claim 149, wherein said second component includes a buffer, calcium source, stabilizer, sweetener, fruit, flavoring agent, and mixtures thereof.

159. The method as defined in claim 158, wherein said second component includes a buffer, said buffer having an average particle size that is less than an average particle size of said acid, said buffet basing an average particle size of less than about 590 microns.

160. The method as defined in claim 158, wherein said second component includes a gelling agent, said gelling agent including a calcium source.

161. The method as defined in claim 159, wherein said second component includes a gelling agent, said gelling agent including a calcium source.

162. The method as defined in claim 159, including the step of at least partially controlling the rate of gelling of said pectin during and after said first and second liquid components are blending together by controlling the average particle size of said acid, controlling the average particle size of said buffer, controlling the ratio of acid and buffer content, controlling the temperature of said blend of first and second liquid components, and combinations thereof.

163. The method as defined in claim 161, including the step of at least partially controlling the rate of gelling of said pectin during and after said first and second liquid components are blended together by controlling the average particle size of said acid, controlling the average particle size of said buffer, controlling the average particle size of said calcium source, controlling the ratio of said acid and said buffer content, controlling the ratio of said acid and said calcium source content, controlling the ratio of said buffer and said calcium source content, controlling the temperature of said blend of first and second liquid components, and combinations thereof.

164. The method as defined in claim 149, wherein said blending it less than about 60 seconds.

165. The method as defined in claim 149, wherein said blending is by a high speed mechanical blender.

166. The method as defined in claim 149, wherein said solid content of said homogeneous mass is at least about 60%.

167. The method as defined in claim 166, wherein said solid content of said homogeneous mass is about 60–85%.

168. The method as defined in claim 149, wherein said homogeneous mass is has a water activity of less than about 0.8.

169. The method as defined in claim 149, wherein said homogeneous mass has an acidic pH.

* * * * *